United States Patent [19]

Bakos et al.

[11] Patent Number: 4,761,352

[45] Date of Patent: Aug. 2, 1988

[54] ACCORDIAN FOLDED ELECTRODE ASSEMBLY

[75] Inventors: Vincent W. Bakos; Thomas W. Martin, both of Rochester, N.Y.

[73] Assignee: Eastman Kodak Company, Rochester, N.Y.

[21] Appl. No.: 735,406

[22] Filed: May 17, 1985

[51] Int. Cl.$^4$ .................... H01M 4/00; H01M 2/16
[52] U.S. Cl. .................... 429/94; 429/136; 429/246
[58] Field of Search ............... 429/136-139, 429/94, 246

[56] References Cited

U.S. PATENT DOCUMENTS

| | | | |
|---|---|---|---|
| 2,157,629 | 5/1939 | Rolph | 136/147 |
| 3,442,717 | 5/1969 | Horn et al. | 136/176 |
| 3,642,540 | 2/1972 | Argent et al. | 136/175 |
| 3,663,721 | 5/1972 | Blondel et al. | 136/6 |
| 4,029,855 | 6/1977 | Dougherty et al. | 429/82 |
| 4,051,304 | 9/1977 | Snook | 429/94 |
| 4,479,300 | 10/1984 | Savage | 29/623.1 |
| 4,560,631 | 12/1985 | Nishihama et al. | 429/194 |

Primary Examiner—Brian E. Hearn
Assistant Examiner—Stephen J. Kalafut
Attorney, Agent, or Firm—John R. Everett

[57] ABSTRACT

An electrode assembly of an anode, a cathode and insulating separator material between the cathode and the anode characterized in that the entire anode, the entire separator and the entire cathode are laminated together in an accordian fold is disclosed. The assembly is useful in electrochemical cells.

8 Claims, 2 Drawing Sheets

ACCORDIAN FOLDED ELECTRODE ASSEMBLY

FIELD OF THE INVENTION

The invention relates to an electrode assembly, a method for making the electrode assembly and electrochemical cells in which the electrode assembly is used.

BACKGROUND OF THE INVENTION

Various configurations of electrode assemblies consisting of an anode and a cathode have been disclosed. The configuration and the arrangement of such electrode assemblies in a particular housing is important in that the assembly and configuration impacts upon the (1) amount of active electrode material that can be included in each cell, (2) electrical performance, and (3) the ease of manufacturing.

A useful electrode assembly configuration is disclosed in U.S. Pat. No. 3,663,721. Therein, an electrochemical cell is disclosed in which the lithium anode comprises a unitary and continuous length of zig-zag pleated lithium of a selected width. Individual cathode plates are positioned between pairs of the pleated electrode. A separator is placed between the cathode and the anode to prevent electrical contact between the anode and the cathode.

While this electrode assembly is useful, it is disadvantageous in that it requires the manufacturing step of placing separate cathode plates between the zig-zag pleated anode. Also, such an arrangement requires a series of electrical connections to be made between the various cathode plates and the external electrical contact with the cathode thereby increasing the opportunities for short circuits to occur.

SUMMARY OF THE INVENTION

The present invention provides an electrode assembly of an anode, a cathode and insulating separator material between the cathode and the anode characterized in that the entire anode, the entire separator and the entire cathode are laminated together in an accordian fold. An accordian fold comprises one or more "V" folds.

The electrode assembly of this invention is advantageous in that it avoids (1) the need for the manufacturing steps involved in making separate cathode plates and subsequently inserting such plates into the pleats of a zig-zag anode and (2) the need to make a series of electrical connections between individual cathode plates. Since the cathode is itself continuous, only one electrical contact need be made to the cathode.

PREFERRED EMBODIMENTS OF THE INVENTION

In a preferred embodiment, the anode of the electrode assembly of this invention is a three piece laminate comprising, in the following order, (a) a metal foil current collector support;
(b) a layer of a malleable anode-active material; and
(c) a layer of an insulating separator material.

In this embodiment, the electrochemical cell constructed with the accordian folded electrode assembly of this invention has (1) decreased internal resistance and (2) better utilization of the anode-active material compared to electrochemical cells in which the anode is coated on a metal grid current collector. This will be explained in greater detail hereinafter with reference to the drawings.

DETAILS OF THE INVENTION

Applicants will now proceed to describe the anode and cathode construction, the separator and the technique by which they are brought together in a laminate structure and subsequently accordian folded. In this description of the invention, lithium anodes and $MnO_2$ cathodes are used. It will be recognized that the invention will work with most electrode assemblies using solid fuel.

Figure 1:
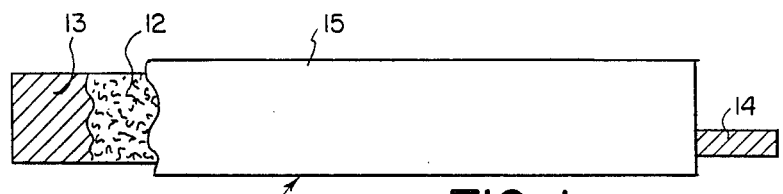
FIG. 1 is a schematic drawing of the anode assembly.

The anode 11 in FIG. 1 is essentially a three piece laminate comprised of lithium 12 coated on a 1 mil stainless steel foil current collector 13. A portion of the stainless steel foil 13 is left uncoated and trimmed to form the anode terminal 14. A separator 15 such as Celgard TM 4510 (available from Celanese) and/or non-woven polypropylene is rolled over the entire lithium anode 11. The separator is a porous electrically-insulating material which prevents electrical contact between the anode and the cathode but allows movement of ions.

Other useful anode-active materials include any malleable anode material such as alkali metals (Na and K), Li-Al alloys, Li-Si alloys, Li-B alloys and the metals of Groups Ia and IIa of the periodic table of elements. Malleable anode-active materials are coatable on metal foil. Also, the separator can be coated onto the surface of the active material with considerable adherence of the separator to the anode layer. Metal foils which can be used as the current collector and support include metals such as nickel, stainless steel, aluminum and titanium.

While this embodiment of the invention is exemplified by having the insulating separator placed over the anode, it is clear that the invention works equally well when the separator is placed over the cathode. In any case, a small excess of separator is left relative to the ends of the electrode. The total length and thickness of the anode will be dictated by the fuel loading requirements of the electrochemical cell or battery specification under consideration.

Figure 2:
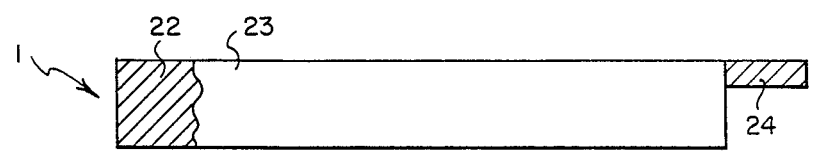
FIG. 2 is a schematic drawing of a typical cathode assembly.

The cathode is a laminate as shown in FIG. 2. It is made with $MnO_2$. The $MnO_2$ cathode 1 comprises a stainless steel grid current collector 22 coated on one or both sides with a mixture of $MnO_2$, carbon and Teflon TM 23. A small portion of the stainless steel current collector is left uncoated and shaped at one end to function as a cathode terminal 24.

The wide variety of cathode-active materials which would be useful in the electrode assemblies of this invention include the various forms of polyfluorocarbons, i.e. $(CF_x)_n$ wherein $x<4$ and n is some indeterminate large number, $FeS_2$, FeS, CuO and $Bi_2O_3$.

Figure 3:
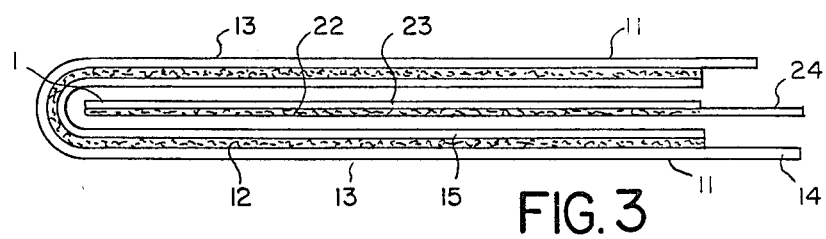
FIG. 3 shows the anode and cathode being laminated together prior to the accordian fold.

A complete electrode assembly is shown in FIG. 3. It is made by positioning the cathode 1 on top of the separator 15 attached to the anode 11 so that the cathode terminal 24 and the anode terminal 14 are side by side but are not in electrical contact. The cathode, in this embodiment of the invention, is about one-half the length of the anode. The entire anode 11 is then folded over the entire cathode 1 to form a laminate structure in which the cathode 1 is sandwiched between the folds of the anode 11.

Figure 4:
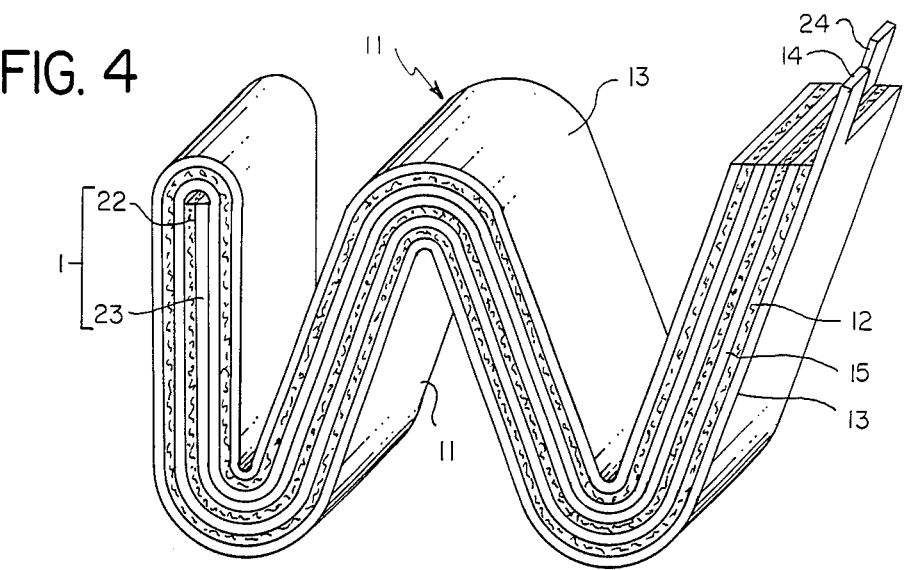
FIG. 4 shows the laminate of FIG. 3 in an accordian fold.

Next, the complete electrode assembly of FIG. 3 is then accordian folded manually as shown in FIG. 4. The accordian folded electrode assembly of FIG. 4 is a series of connected "V" folds. The accordian folded electrode assemblies of this invention comprise two or more "V" folds. The length of each leg in the fold and the number of folds and legs will, of course, be determined by the dimensions of the container in which the electrode assembly is to be inserted. Obviously, electrode assemblies having more than two "V" folds or four legs are possible, depending upon the fuel loading requirements of the intended power application and the specific anode and cathode materials used.

One method for folding the electrode assembly of this invention, referring to FIG. 3, is to make sequential folds beginning at the end away from the contacts 14 and 24. As each fold is made, the loose ends of the separate components are thus free to shift enough to reduce stresses and strains at the fold thereby preventing pinching, cracking, breaking, delamination, shorting, or the like.

Figure 5:
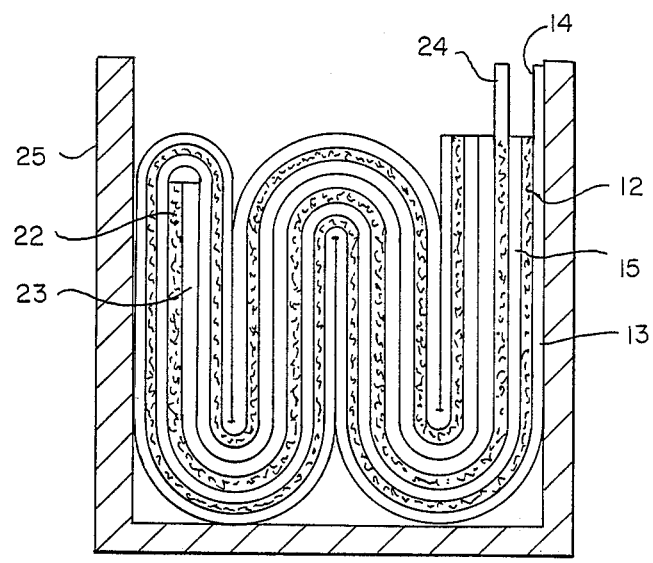
FIG. 5 shows an electrochemical cell comprising an electrode assembly of the invention.

After checking for internal electrical shorts with an ohmmeter, the electrode assembly is made into an electrochemical cell or battery by first inserting the assembly into a container 25 such as shown in FIG. 5. An electrolyte comprising, for example, a solvent mixture of a propylene carbonate and dimethoxyethane or butyrolactone and dimethoxyethane with a lithium salt such as lithium perchlorate or lithium tetrafluoroborate is added to the container 25.

The electrode assembly is inserted in the container so that electrode terminals 14 and 24 protrude upward forming a complete electrochemical cell or battery. The cell can be sealed with a cap if desired. Such caps and methods of sealing the cap to the container are well known in the battery art.

In the accordian folded electrode assembly of FIG. 4, electrical contact between each leg of the anode is achieved when the legs of the assembly are pressed together and inserted into the container of FIG. 5. This electrical contact is achieved through the physical contact of the metal foil collector current collectors 13 of the anode assembly 11. This electrical contact between each leg of metal foiled back anode decreases the internal resistance of electrochemical cells because electrons have a shorter path to travel to reach the anode terminal compared to anodes and electrode assemblies having a different configuration.

Moreover, the anode construction of FIG. 1 facilitates greater utilization of the anode-active material since substantially all of the anode-active material is in direct electrical contact with the metal foil current collector. This is in contrast to metal grid collectors in which much of the anode-active material is only indirectly in electrical contact with the grid current collector.

The invention has been described in detail with particular reference to preferred embodiments thereof, but it will be understood that variations and modifications can be effected within the spirit and scope of the invention.

We claim:

1. An electrochemical cell having an electrolyte and an electrode assembly comprising a lithium anode, a $MnO_2$ cathode and an insulating separator material between the anode and cathode, wherein
    (a) the anode and the separator forms a three piece laminate comprising in the following order
        (i) a metal foil current collector support;
        (ii) a layer of lithium and
        (iii) a layer of an insulating separator material;
    (b) the anode is about twice the length of the cathode;
    (c) the anode is folded in half;
    (d) the cathode, comprising a metal foil current collector coated on both sides with $MnO_2$, is sandwiched between the fold of the anode to form the electrode assembly; and
    (e) the entire electrode assembly is laminated together in an accordian fold.

2. An electrode assembly of an anode, a cathode and insulating separator material between the cathode and the anode wherein
    (a) the anode is about twice the length of the cathode, the anode is folded in half and the cathode is sandwiched between the fold of the anode and the entire assembly is accordian folded and
    (b) the anode and the separator is a three piece laminate comprising, in the following order,
        (i) a metal foil current collector support;
        (ii) a layer of a malleable anode-active material; and
        (iii) a layer of the insulating separator material.

3. The assembly of claim 2 wherein the active cathode material is selected from the group consisting of polyfluorocarbons, $FeS_2$, $FeS$, $CuO$, $MnO_2$ and $Bi_2O_3$.

4. The assembly of claim 2 wherein the anode-active material is lithium and the cathode comprises $MnO_2$ as the active material.

5. The assembly of claim 2 or 4 wherein the cathode is laminated to a stainless steel grid current collector.

6. An electrochemical cell comprising an electrolyte and an electrode assembly of claim 2 or 4.

7. An electrochemical cell comprising the electrode assembly of claim 2 or 4 and an electrolyte comprising a solvent mixture of (a) propylene carbonate and dimethoxyethane or (b) dimethoxyethane and butyrolactone and a lithium salt.

8. The assembly of claim 2 or 4 wherein the cathode comprises a metal foil current collector coated on both sides with the active cathode material.

* * * * *